US008311907B2

(12) United States Patent
Klein et al.

(10) Patent No.: US 8,311,907 B2
(45) Date of Patent: Nov. 13, 2012

(54) SYSTEM AND METHOD FOR DETECTING FRAUDULENT TRANSACTIONS

(75) Inventors: Amit Klein, Herzliya (IL); Ronen Heled, Kiryat-Ono (IL); Lior Golan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 988 days.

(21) Appl. No.: 12/089,523

(22) PCT Filed: Oct. 11, 2006

(86) PCT No.: PCT/US2006/039638
§ 371 (c)(1),
(2), (4) Date: Nov. 20, 2008

(87) PCT Pub. No.: WO2007/044763
PCT Pub. Date: Apr. 19, 2007

(65) Prior Publication Data
US 2009/0182652 A1    Jul. 16, 2009

Related U.S. Application Data

(60) Provisional application No. 60/724,877, filed on Oct. 11, 2005.

(51) Int. Cl.
*G07B 17/00* (2006.01)
*G07F 19/00* (2006.01)

(52) U.S. Cl. ........................................................ 705/30

(58) Field of Classification Search ...................... 705/30
See application file for complete search history.

(56) References Cited

U.S. PATENT DOCUMENTS

| 7,587,196 | B2 * | 9/2009 | Hansen | 455/406 |
|---|---|---|---|---|
| 7,610,040 | B2 * | 10/2009 | Cantini et al. | 455/410 |
| 7,835,921 | B1 * | 11/2010 | Donnelly et al. | 705/2 |
| 2002/0099649 | A1 | 7/2002 | Lee et al. | |
| 2003/0053610 | A1 * | 3/2003 | Richardson | 379/126 |
| 2003/0097330 | A1 | 5/2003 | Hillmer et al. | |
| 2003/0187759 | A1 * | 10/2003 | Arthus et al. | 705/30 |
| 2003/0187783 | A1 * | 10/2003 | Arthus et al. | 705/39 |
| 2004/0162987 | A1 | 8/2004 | Doyle et al. | |
| 2005/0018824 | A1 * | 1/2005 | Richardson | 379/126 |
| 2007/0073630 | A1 * | 3/2007 | Greene et al. | 705/80 |
| 2008/0010678 | A1 * | 1/2008 | Burdette et al. | 726/15 |
| 2009/0037213 | A1 * | 2/2009 | Eisen | 705/1 |

OTHER PUBLICATIONS

Joel Ceausu. "Screening out E-fraudsters: St. Laurent firm's software helps weed out bogus online credit-card transactions :[Final Edition]." The Gazette Nov. 29, 2000, ProQuest Newsstand, ProQuest. Web. Jul. 6, 2012.*
International Search Report for International Application No. PCT/US06/39638 mailed Sep. 14, 2007.

* cited by examiner

*Primary Examiner* — Seye Iwarere
(74) *Attorney, Agent, or Firm* — BainwoodHuang

(57) ABSTRACT

Some demonstrative embodiments of the invention include a system and method for detecting related transactions, e.g., fraudulent transactions by for example associating transactions and creating lists of related transactions. Other embodiments are described and claimed.

28 Claims, 4 Drawing Sheets

| Trx# | Time | IP | Merchant | Amount | Card# | Cookie |
|---|---|---|---|---|---|---|
| 1 | 00:00 | 10.1.1.1 | ABC | $99.95 | xxxxx1234 | 13291283 |
| 2 | 00:03 | 10.1.1.1 | Foo Inc. | $120.00 | xxxxx9475 | 34827947 |
| 3 | 01:24 | 10.100.2.3 | Bar Ltd. | $50.00 | xxxxx5567 | 45938554 |
| 4 | 03:47 | 10.2.2.5 | Baz PLC | $300.00 | xxxxx7789 | 34585233 |
| 5 | 03:48 | 10.45.66.1 | NNC | $10:00 | xxxxx3459 | 48734890 |
| 6 | 03:49 | 10.55.33.2 | DOT Com | $24.75 | xxxxx5567 | 45938554 |
| 7 | 03:51 | 10.6.7.8 | DOT Com | $24.75 | xxxxx4573 | 93649234 |
| 8 | 05:19 | 10.5.8.9 | Whatever | $600.00 | xxxxx1234 | 78768765 |
| 9 | 12:04 | 10.5.3.2 | Pogo | $200.00 | xxxxx4999 | 34534554 |
| 10 | 23:50 | 10.5.5.5 | ACME | $395.00 | xxxxx9475 | 24234243 |

SYSTEM AND METHOD FOR DETECTING FRAUDULENT TRANSACTIONS

CROSS-REFERENCE TO RELATED APPLICATIONS

This application is a National Phase Application of PCT International Application No. PCT/US2006/039638, entitled "SYSTEM AND METHOD FOR DETECTING FRAUDULENT TRANSACTIONS", International Filing Date Oct. 11, 2006, published on Apr. 19, 2007 as International Publication No. WO 2007/044763, which in turn claims priority from US Provisional Patent Application No. 60/724,877, filed Oct. 11, 2005, both of which are incorporated herein by reference in their entirety.

BACKGROUND OF THE INVENTION

In the world of online financial transactions, there is an increasing need for detecting fraudulent transactions. Current fraud detection methods may cancel particular transactions involving a stolen credit card, or may identify fraud based on a purchase unsuitable to a user profile. However, these technologies generally fail to address subtle cases of fraud, where the transaction itself may appear genuine.

There is a need for a method of detecting fraud in a more accurate manner, e.g., a detection of fraudulent transactions that are subtle and almost identical to genuine transactions using available computing power, storage capacity and retrieval speed.

SUMMARY OF SOME DEMONSTRATIVE EMBODIMENTS OF THE INVENTION

Embodiments of the invention may perform a method for identifying fraudulent transactions comprising receiving at least one marled transaction record and a set of unmarked transaction records; providing a relation value for unmarked transaction records with respect to at least one marked transaction record, said relation value based on an outcome of at least one equivalence function; marking transaction records satisfying a marking condition based on said relation value; and repeating said steps of providing a relation value and marking transaction records until a termination condition is reached.

Embodiments of the invention may provide a system for identifying fraudulent transactions comprising: a processor to receive at least one marked transaction record and a set of unmarked transaction records, provide a relation value for unmarked transaction records with respect to at least one marked transaction record, said relation value based on an outcome of at least one equivalence function, mark transaction records satisfying a marking condition based on said relation value, and repeat said steps of providing a relation value and marking transaction records until a termination condition is reached.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 2 is a exemplary table illustrating transactions database according to one demonstrative embodiment of the invention;

Figure 1:
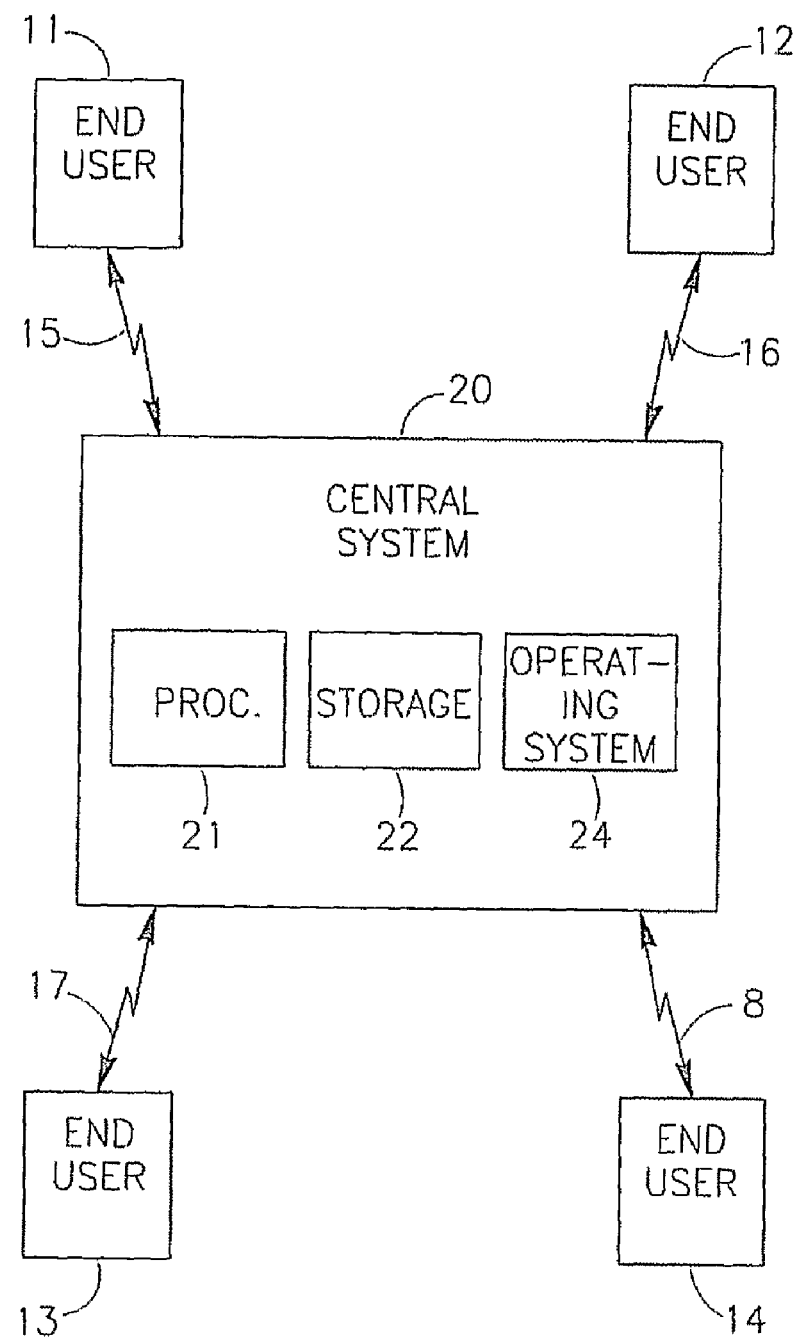
FIG. 1 depicts a fraudulent transactions detecting system 10 according to one embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

The processes presented herein are not inherently related to any particular computer or other apparatus. Various general-purpose systems may be used with programs in accordance with the teachings herein, or it may prove convenient to construct a more specialized apparatus to perform embodiments of a method according to embodiments of the present invention. Embodiments of a structure for a variety of these systems appear from the description herein. In addition, embodiments of the present invention are not described with reference to any particular programming language. It will be appreciated that a variety of programming languages may be used to implement the teachings of the invention as described herein.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some demonstrative embodiments of the invention may provide a system and method for detecting fraudulent transactions, e.g., verifying the authenticity of a desired transaction as described in detail below.

It will be appreciated that the terms "transaction" as used herein may refer to any, transfer of information, transfer of details, e.g., including currency, goods, services, rights to services and the like. The records may be such made by users communicating over secure or non-secure channels.

It will be appreciated that the term "channel" for example, as used herein may refer to any pathway used to convey information from a one computing system to a second computing system, e.g., from a transmitter to a receiver. It will be understood that embodiments of the present invention may be implemented over secure channels as well as non-secure channels.

FIG. 1 depicts a fraudulent transaction detection system 10 according to one embodiment of the present invention. Referring to FIG. 1, end users such as end user 11, end user 12, end user 13 and end user 14 may use terminals such as a personal computer, automated teller machine, PDA, telephone, cellular device, or other computing device. An end user, for example, end user 14 may wish to conduct a transaction (e.g., log in to an online website or service, make a purchase, open a financial account, etc.) with a central system 20. Users may engage in financial transactions with central system 20, or central system may obtain transaction information from other transaction servers with which users transact. It will be appreciated that the interaction of the central system 20 with users is not necessary for implementation of the present invention.

Central system 20 may be, for example, a provider that may provide services containing, requesting or otherwise using confidential or private information, for example, a financial institution ("FI"), government agency, health institution, communication service provider or any other institution, authority, provider or entity. Central system 20 may include any sort of central system, for example, a server, an internet server, an email server, SSL server or any other a central computing system. Anyone of end users 11-14 and central system 20 may communicate, for example, via one or more communications network(s) or channel(s) 15-18 such as, for example, the Internet, wireline or wireless telephone, a cellular system, intranets, data lines, a combination of networks, etc.

Central system 20 may further include, for example, a processor 21, a storage unit 22, and an operating system 24. Central system 20 may be implemented using any suitable combination of hardware components and/or software components.

Processor 21 may include, for example, a Central Processing Unit (CPU), a Digital Signal Processor (DSP), one or more controllers, or any suitable specific and/or general and/or multi-purpose processor or micro-processor or controller. Storage unit 22 may include memory units, for example, Random Access Memory (RAM), Read Only Memory (ROM), Dynamic RAM (DRAM), or other suitable memory systems. Operating system 24 may include, for example, Microsoft Windows, Linux, Unix, Apple OS, Solaris, Sun-OS, HP-UX, or other suitable operating systems. It is noted that processor 21, storage unit 22, and/or operating system 24 may include other suitable components and/or implementations as is known in the art.

In some embodiments of the invention each transaction made by one of end user 11-14 may have certain characteristics such as transaction information also referred to herein as a "record". A record may include a collection of fields, for example, a transaction time, an IP address of the transaction performer, a transaction Cookie, a user name, a password, a credit card number and/or amount of money of the transaction. Any other information may be included. A record may be stored anywhere accessible by the processor 21, for example, in storage unit 22, and the information may be arranged and/or stored in multiple fields.

Reference is made to FIG. 2, which is an exemplary table illustrating transactions database according to one demonstrative embodiment of the invention.

It will be appreciated that the term "database", as used herein may refer to any set of records, e.g., plurality of statistics, data, facts, numbers or other information related to a performed transaction. Each record in a database may include fields, such as the fields denoted above. It will be understood that embodiments of the present invention may implement storing of information configured in forms other than a table such as for example, an array a set, a tree, a hash table or other data structures.

Database 200 may include transaction records (column 201), a record may represent the information known of a performed transactions, e.g., a record may represent an online e-commerce transaction or the like. The information may be stored in fields, for example, time (column 202), IP address (column 203), merchant (column 204), transaction amount (column 205), credit card number (column 206), cookie (column 207), etc.

Referring back to FIG. 1 database 200 may be stored in, for example, storage unit 22 of central system 20. In some embodiments of the invention related records may be defined, identified, classified and/or recognized, for example by processor 21 and/or operating system 24. In some embodiments, database 200 may be stored externally to central system 20, and may be accessible, for example, by a plurality of central systems.

Figure 3:
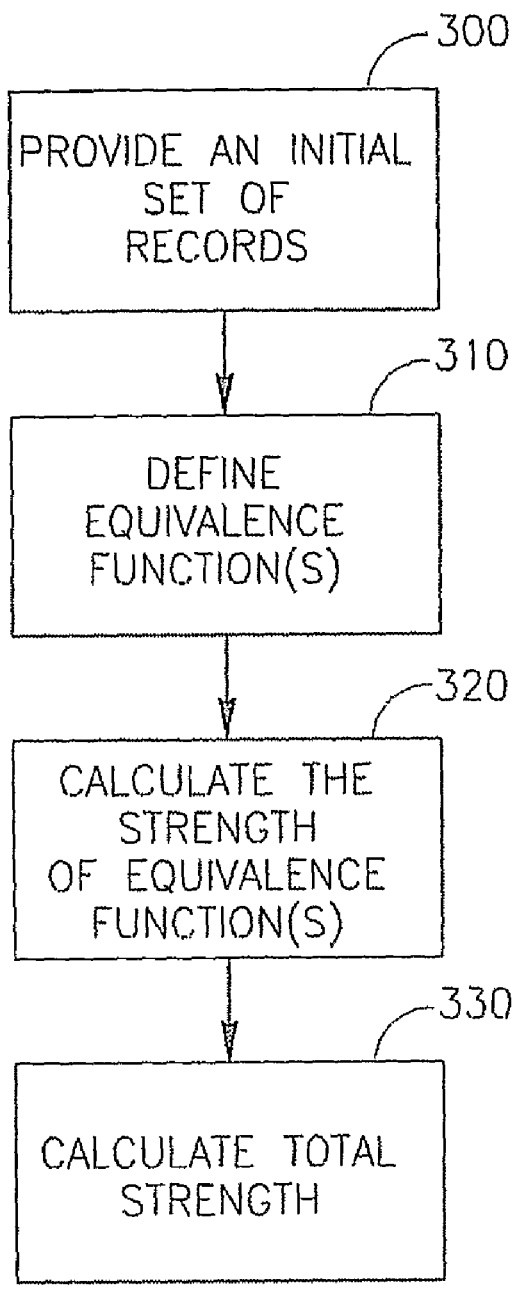
FIG. 3 a schematic depiction of a method for detecting fraudulent transactions in accordance with an embodiment of the invention.

Reference is made to FIG. 3, a schematic depiction of a method for detecting fraudulent transactions in accordance with an embodiment of the invention.

Although the scope of the present invention is not limited in this respect, in block 300 an initial set of one or more records may be identified. For example, the initial subset may be a set of known fraudulent transactions. According to embodiments of the invention, the information provided by the initial subset may be used to find, identify, classify or perform any other operation on records that may be related to other records in the subset, as described in detail below. In some embodiments an initial subset of records may be used to separate a set of records into clusters of related records based on the outcomes of equivalence functions.

In block 310 one or more equivalence functions may be defined. These equivalence functions may be useful to locate records related to the initial subset of records. An equivalence function may be defined based on one or more fields of a record. In some embodiments, an equivalence function, which may differ from field to field, may be defined for each field or for a plurality of fields. The equivalence function may provide a strength or relevance of connection between records based on a comparison of the relevant fields. In some embodiments of the invention some fields may not have an equivalence function. The equivalence functions defined to evaluate a particular transaction may be selected based on parameters or characteristics of the transaction.

Although the scope of the present invention is not limited in this respect, different equivalence functions may be assigned to different fields and may correspond to the relation, connection, link or relationship of two or more records. The value or result of the equivalence function value, which may define how tight or close two or more records may be, is also referred to herein as the strength of the equivalence function. The total strength of the connection between two or more records may be calculated as a function of all or a plurality of relevant strengths of the equivalence functions of their respective fields, as is described in detail below.

For example, an equivalence function may be strict identity of fields, e.g., two records may be related if the credit card number used for both transactions is identical.

In some embodiments of the invention, an equivalence function may be defined as providing any of a set of discrete outcomes based on different conditions. For example, an equivalence function for a first identified transaction and a second transaction based on IP address field may provide a low value if only the class B value of the IP address is the same, a medium value if the IP address is the same, and a yet higher value if the IP address is the same and the usages are within a predefined period of each other.

In block 320 the strength or value of equivalence functions of various fields may be calculated based on equivalence functions defined in block 310.

In block 330 the total strength of two or more records may be calculated based on the strengths of the equivalence functions of their respective fields which may be calculated in block 320. The total strength may be the sum total of the equivalence functions of the fields. The total strength of, for example, two records may imply or give indication of the connection, relation or link between those two records. A given record may have one or more records that may be connected to it, e.g., whose connection strength with the given record is nonzero.

In some embodiments of the invention the initial set of records, e.g., provided in block 300, may be marked with a certain fraudulence score or value. Such a value may be for example, a number, or any other indication. The score assigned to marked records, e.g., fraudulent records, may be transferred to other, related records, as is described in detail below. The score may be diluted upon transfer in order to prevent marking all records.

Although the scope of the present invention is not limited in this respect, each record in the initial set of records, e.g., provided in block 300, may assigned a value at a certain level, for example, a maximum level. The related records that may be found, as described in detail below, may be assigned a value based on the value of the records to which it is related, and to the strength of the relation based on the strength of the equivalence function. This value may be lower, e.g., diluted, relative to the value of the originating record in the initial set. In case the new record is related to several records, its resulting value may be less diluted, for example, based on the number of marked records to which it is related. This process may be repeated until a termination condition occurs, as described in detail below.

Figure 4:
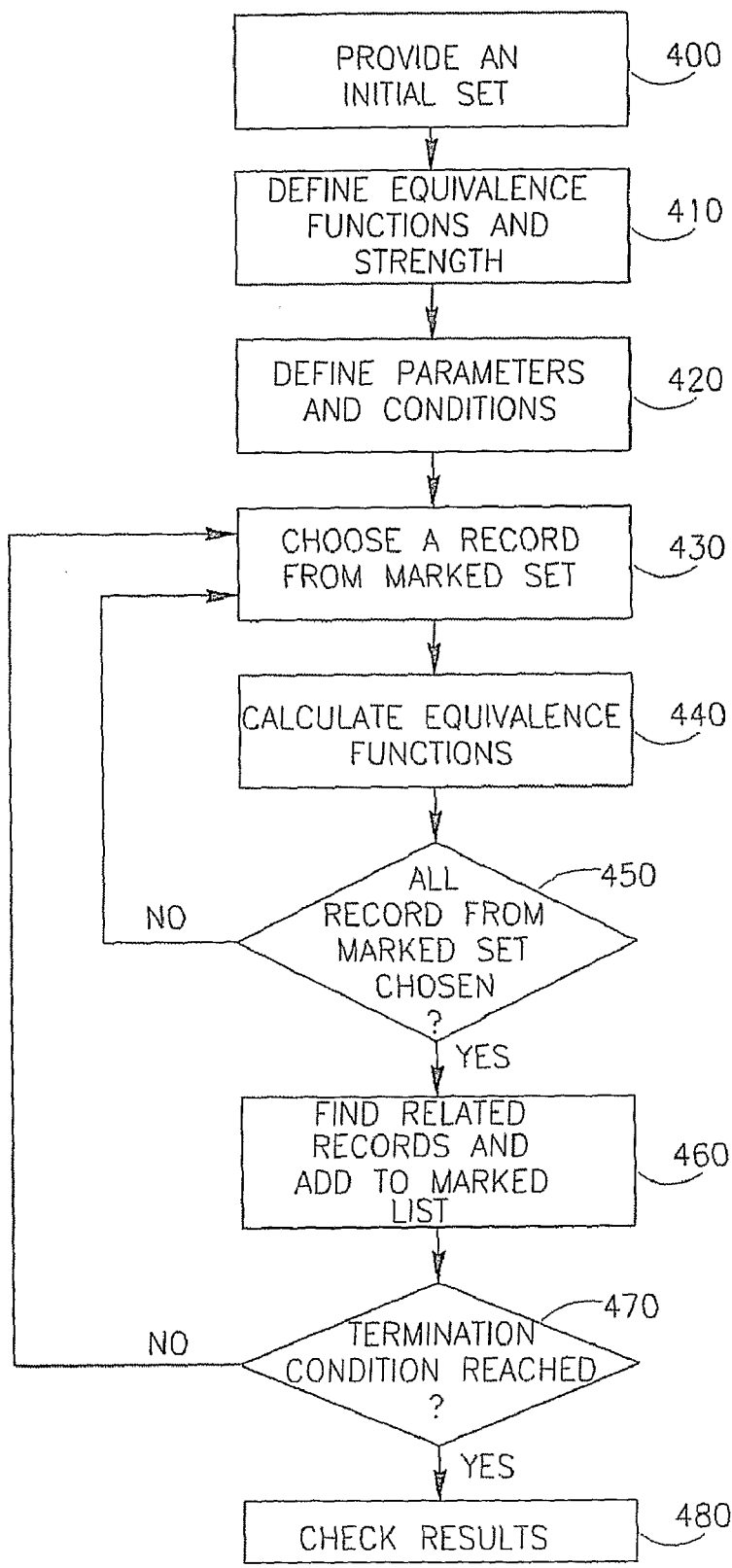
FIG. 4 a schematic depiction of an exemplary algorithm for detecting fraudulent transactions in accordance with an embodiment of the invention.

Reference is made to FIG. 4, a schematic depiction of an exemplary algorithm for detecting fraudulent transactions in accordance with an embodiment of the invention.

The following illustration outlines a solution architecture according to one embodiment of the present invention; other suitable architectures are possible in accordance with other embodiments of the invention:

Although the scope of the present invention is not limited in this respect, the algorithm may be employed in an online e-commerce system in order to identify fraudulent transactions. In such an embodiment that the records may be online e-commerce transactions in a database.

In block 400 an initial set of transactions to be reviewed for fraud may be provided. The initial set of transactions may be, for example, fraudulent transactions from charge-back records, from case-management entries or the like. The transactions provided may be added to a database containing all records, each record may be comprised of fields, for example, a record may include the following fields: date, time, IP address, merchant, transaction amount, credit card number, permanent cookie, etc.

In block 410 equivalence functions may be defined based on one or more fields of a record. A weight, strength or value of each equivalence function may also be defined in accordance with the importance or significance of an equivalence function.

For example, the equivalence function of the permanent cookie field may be defined as equality or identity function, e.g., the algorithm may search for the identical permanent cookie in other records. The value or strength given to such a match may be high, for example, 10 on a scale of 0 to 10. Another equivalence function may be based on a plurality of fields, such as amount, merchant, date and time, e.g., the algorithm may search for an identical or near-identical amount and merchant field, and no more than 10 hours difference in date and time fields. The value or strength given to such an equivalence function may be, for example, 3 in a scale of 0 to 10.

In some embodiments, an equivalence function may be defined to provide discrete values for different circumstances. For example, one equivalence function may provide a value of 4 based on an identical of IP address within 10 minutes and a value of 1 based on mere identity of the class B value of the IP address.

In block 420 parameters and conditions used with the algorithm, such as total strength or value of a record, initial value of a record and termination condition of the algorithm may be defined. Other parameters and conditions may be defined.

For example, the total strength of a record may be defined as the sum of all equivalence function strengths, initial value may be defined as a constant, e.g., 100, and a fade effect may be the total strength divided by 25, multiplied by the value of the record already in the set. The termination condition may be defined as number of iterations, e.g., 2 iterations.

In block 430, a record from the marked set of records may be chosen. The marked set of records may include at least the initial set of records. In subsequent iterations, the marked set may include records marked in a previous iteration, as described in detail in block 460. For example, with reference to FIG. 2 the initial set may include records 1 and 3. In the below example, record 1 may be chosen.

In block 440 the equivalence functions of all records may be calculated with reference to the record chosen in block 430. For example, with reference to FIG. 2 the equivalence functions of records 2 and 4-10 may be calculated with reference to record 1. In this embodiment, record 3, which is included in the initial set and known to be fraudulent need not be examined.

In block 450 a determination may be made as to whether the equivalence functions of all records have been calculated with reference to every record from the marked list. For example, with reference to FIG. 2 in the first iteration after equivalence functions of records 2 and 4-10 have been calculated with reference to record 1 a transition is made to block 430 and record 3 may be chosen.

In block 460 all records connected or related to records from the marked set may be found, e.g., based on the value calculated in block 440, and added to the marked list.

For example, with reference to FIG. 2 in the first iteration, the algorithm may find the following records as connected to record 1:

For record 2 (same IP address, 3 minutes apart), the total strength calculated may equal 4. Therefore, record 2 may be marked with value 16 and may be added to the marked list.

For record 8 (same card number), the total strength calculated may equal 5. Therefore, record 8 may be marked with value 20 and may be added to the marked list.

In the first iteration, the algorithm may also find the following records as connected to record 3:

For record 6 (same card, same cookie), the total strength calculated may equal 15. Therefore, record 8 may be marked with value 60 and may be added to the marked list.

In block 470, a determination may be made as to whether a termination condition has been reached. A termination condition may be, for example, a maximum number of iterations, whether new records remain to be added to the marked set, whether there remain new records with calculated value above a certain threshold to be added to the marked set. Other termination conditions may be used.

If no termination condition is met, a transition loop may be made back to block 430. For example, with reference to FIG. 2 a second iteration may look for records connected to records 2, 8 and 6.

For record 2, record 10 may be found having identical card number. The total strength calculated may equal 5. Thus, record 10 may be marked with value 3.2 (i.e., 5 times 16 divided by 25) and may be added to the marked list.

For record 8, no connected records may be found.

For record 6, record 7 may be found having identical merchant and amount, within a time difference of 2 minutes. The total strength calculated may be 3. Thus, record 7 may be marked with value 7.2 (i.e., 3 times 60 divided by 25) and may be added to the marked list.

In block 480, the results, e.g., the current marked list, may be reviewed. The marked list may include all records from the initial set provided and may also include all records which may be related to the original given set of records. The value of each record may indicate a level of relation to the original initial set of records.

For example, with reference to FIG. 2, and based on the above provided equivalence functions and termination condition, records 1 and 3 may be highly connected to the original set (level 100), other records may be also connected to the original set, e.g., record 6 (level 60), record 8 (level 62), record 2 (level 16), record 7 (level 7.2) and record 10 (level 3.2). Records 4, 5 and 9 may be found as unrelated since no value level is attached to them. The system may apply a threshold minimum value for determining a fraudulent transaction after a number of iterations.

Although the scope of the present invention is not limited in this respect, for example in fraud detection, the color level may be indicative of fraud. The stronger the value associated with a transaction, the greater the likelihood that a transaction is fraudulent. Embodiments of the present invention may therefore enable fraud-fighters to locate seemingly innocent and unrelated transaction such as, for example, record 7, and to flag the transaction as fraudulent, although the transaction may not have any obvious connection with any of the known fraudulent transactions, e.g., records 1 and 3.

It should be obvious that the above implementation of the method (e.g. performing iterations) is merely one possible implementation, and that other possibilities are available for listing the related records, for example, employing complex SQL queries to simultaneously find all related records of all records in the initial set, and so forth.

Various devices, architectures, and sets of devices may form a system according to various embodiments of the present invention, and may effect a method according to embodiments of the present invention. Methods according to various embodiments of the present invention may be executed by one or more processors or computing systems (including memories, processors, software, databases, etc.), which, for example, may be distributed across various sites or computing platforms. Alternatively, some methods according to embodiments may be executed by single processors or computing systems.

Embodiments of the present invention may be implemented by software, by hardware, or by any combination of software and/or hardware as may be suitable for specific applications or in accordance with specific design requirements. Embodiments of the present invention may include units and subunits, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method for identifying fraudulent transactions comprising:

receiving, by a processor, a set of at least one marked transaction record each transaction record in said set of marked transaction records respectively associated with a fraud score indicating a fraudulent transaction and a set of unmarked transaction records;

for each unmarked transaction record in the set of unmarked transaction records, generating, by the processor, a relation value for the unmarked transaction record with respect to at least one marked transaction record, said relation value based on an outcome of at least one equivalence function therebetween;

associating, by the processor, unmarked transaction records satisfying a marking condition with a fraud score, said fraud score based on said relation value of the unmarked transaction record with respect to the marked transaction record and its respective fraud score, thereby rendering unmarked transaction records having a fraud score as newly marked transaction records; and repeating said steps of generating a relation value and associating unmarked transaction records with a fraud score using the marked and newly marked transaction records as the set of marked transaction records, until a termination condition is reached.

2. The method of claim 1, further comprising after said termination condition is reached, reporting said marked transaction records as fraudulent.

3. The method of claim 2, wherein said relation value is based on outcomes of a plurality of equivalence functions applied to unmarked transaction records with respect to said marked transaction record.

4. The method of claim 3, wherein said transaction records each include a plurality of data fields and said plurality of equivalence functions compare at least one data field in said unmarked transaction records to corresponding at least one data field in said marked transaction record.

5. The method of claim 4, wherein said transaction records include information selected from the set consisting of: date of transaction, time of transaction, merchant, transaction amount, IP address, account number, and cookie.

6. The method of claim 4, wherein said data fields include an IP address, and said plurality of equivalence functions includes an equivalence function comparing an IP address associated with said unmarked transaction records with an IP address of said marked record.

7. The method of claim 4, wherein said data fields include a transaction amount, and said plurality of equivalence functions includes an equivalence function comparing a transaction amount associated with said unmarked transaction records with a transaction amount of said marked record.

8. The method of claim 4, wherein said data fields include a credit card number, and said plurality of equivalence functions includes an equivalence function comparing a credit card number associated with said unmarked transaction records with a credit card number of said marked record.

9. The method of claim 4, wherein said data fields include a merchant, and said plurality of equivalence functions includes an equivalence function comparing a merchant associated with said unmarked transaction records with a merchant of said marked record.

10. The method of claim 4, wherein said data fields include a date and a time, and said plurality of equivalence functions includes an equivalence function comparing a date and a time associated with said unmarked transaction records with a date and a time of said marked record.

11. The method of claim 4, wherein said data fields include a cookie, and said plurality of equivalence functions includes an equivalence function comparing a cookie associated with said unmarked transaction records with a cookie of said marked record.

12. The method of claim 4, wherein said relation value for each unmarked record comprises a sum of the outcomes of the plurality of equivalence functions applied to said unmarked transaction record with respect to said marked transaction record.

13. The method of claim 12, wherein said marking condition is a maximum number of repetitions of the steps of providing a relation value for unmarked transaction records and marking transaction records satisfying a marking condition based on said relation value.

14. A system for identifying fraudulent transactions comprising:
a processor to receive a set of at least one marked transaction record each transaction record in said set of marked transaction records respectively associated with a fraud score indicating a fraudulent transaction and a set of unmarked transaction records, for each unmarked transaction record in the set of unmarked transaction records generate a relation value for the unmarked transaction record with respect to at least one marked transaction record, said relation value based on an outcome of at least one equivalence function therebetween, associate unmarked transaction records satisfying a marking condition with a fraud score, said fraud score based on said relation value of the unmarked transaction record with respect to the marked transaction record and its respective fraud score, thereby rendering unmarked transaction records having a fraud score as newly marked transaction records, and repeat said steps of generating a relation value and associating transaction records with a fraud score using the marked and newly marked transaction records as the set of marked transaction records, until a termination condition is reached.

15. The system of claim 14, wherein said processor is further to report said marked transaction records as fraudulent.

16. The system of claim 15, wherein said relation value is based on outcomes of a plurality of equivalence functions applied to unmarked transaction records with respect to said marked transaction record.

17. The system of claim 16, wherein said transaction records each include a plurality of data fields and said plurality of equivalence functions compare at least one data field in said unmarked transaction records to corresponding at least one data field in said marked transaction record.

18. The system of claim 17, wherein said transaction records include information selected from the set consisting of: date of transaction, time of transaction, merchant, transaction amount, IP address, account number, and cookie.

19. The system of claim 17, wherein said data fields include an IP address, and said plurality of equivalence functions includes an equivalence function comparing an IP address associated with said unmarked transaction records with an IP address of said marked record.

20. The system of claim 17, wherein said data fields include a transaction amount, and said plurality of equivalence functions includes an equivalence function comparing a transaction amount associated with said unmarked transaction records with a transaction amount of said marked record.

21. The system of claim 17, wherein said data fields include a credit card number, and said plurality of equivalence functions includes an equivalence function comparing a credit card number associated with said unmarked transaction records with a credit card number of said marked record.

22. The system of claim 17, wherein said data fields include a merchant, and said plurality of equivalence functions includes an equivalence function comparing a merchant associated with said unmarked transaction records with a merchant of said marked record.

23. The system of claim 17, wherein said data fields include a date and a time, and said plurality of equivalence functions includes an equivalence function comparing a date and a time associated with said unmarked transaction records with a date and a time of said marked record.

24. The system of claim 17, wherein said data fields include a cookie, and said plurality of equivalence functions includes an equivalence function comparing a cookie associated with said unmarked transaction records with a cookie of said marked record.

25. The system of claim 17, wherein said relation value for each unmarked record comprises a sum of the outcomes of the plurality of equivalence functions applied to said unmarked transaction record with respect to said marked transaction record.

26. The system of claim 25, wherein said marking condition is a maximum number of repetitions of the steps of providing a relation value for unmarked transaction records and said processor is to mark transaction records satisfying a marking condition based on said relation value.

27. The method of claim 1, wherein the fraud score of said newly marked transaction record is diluted in value compared to the fraud scores of the received marked transaction records.

28. The system of claim 14, wherein the fraud score of said newly marked transaction records is diluted in value compared to the fraud score of the received marked transaction records.

* * * * *